United States Patent
Nardin et al.

(10) Patent No.: US 10,008,968 B2
(45) Date of Patent: Jun. 26, 2018

(54) SYSTEMS AND METHODS FOR SENSING A LINE POWERING AN ELECTRIC MOTOR

(71) Applicant: Regal Beloit America, Inc., Beloit, WI (US)

(72) Inventors: Steven Albert Nardin, Fort Wayne, IN (US); Michael R. Koller, Columbia City, IN (US)

(73) Assignee: Regal Beloit America, Inc., Beloit, WI (US)

(*) Notice: Subject to any disclaimer, the term of this patent is extended or adjusted under 35 U.S.C. 154(b) by 466 days.

(21) Appl. No.: 14/609,040

(22) Filed: Jan. 29, 2015

(65) Prior Publication Data

US 2016/0226422 A1   Aug. 4, 2016

(51) Int. Cl.
*H02P 6/06* (2006.01)
*H02P 27/06* (2006.01)

(52) U.S. Cl.
CPC .................... *H02P 27/06* (2013.01)

(58) Field of Classification Search
USPC ...... 318/400.3, 400.38, 568.16, 787, 400.24, 318/708; 307/104, 413
See application file for complete search history.

(56) References Cited

U.S. PATENT DOCUMENTS

| | | | |
|---|---|---|---|
| 5,179,490 A * | 1/1993 | Lawrence | H02H 11/001 361/42 |
| 5,818,194 A | 10/1998 | Nordby | |
| 6,545,438 B1 * | 4/2003 | Mays, II | H02P 6/08 318/400.01 |
| 7,990,092 B2 | 8/2011 | Woodward | |
| 8,143,828 B2 | 3/2012 | Becerra et al. | |
| 8,558,493 B2 | 10/2013 | Woodward | |
| 2011/0115303 A1* | 5/2011 | Baarman | H02J 17/00 307/104 |
| 2013/0315286 A1* | 11/2013 | Shad | H04B 3/54 375/224 |
| 2014/0139166 A1 | 5/2014 | Durfee et al. | |
| 2014/0265989 A1* | 9/2014 | Becerra | H02P 23/0004 318/503 |
| 2014/0300301 A1 | 10/2014 | Ramsingh | |
| 2015/0003572 A1* | 1/2015 | Kwon | H04L 1/08 375/342 |
| 2016/0099607 A1* | 4/2016 | Landis | H02J 3/30 307/46 |

* cited by examiner

*Primary Examiner* — Eduardo Colon Santana
*Assistant Examiner* — Iftekhar Mustafa
(74) *Attorney, Agent, or Firm* — Armstrong Teasdale LLP

(57) ABSTRACT

A system includes an electric motor controller configured to be coupled to an electric motor is provided. The controller includes a first power input, a second power input, and a third power input, each of the first, second, and third power inputs are configured to receive power from an alternating current (AC) power source. The controller also includes a microcontroller configured to generate a radio frequency (RF) signal in each of the first, second, and third power inputs. The controller further includes an RF based line sensing device configured to sense which one of said first, second, and third power inputs has received power from the AC power source based on the RF signal.

17 Claims, 3 Drawing Sheets

SYSTEMS AND METHODS FOR SENSING A LINE POWERING AN ELECTRIC MOTOR

BACKGROUND

The field of the disclosure relates generally to electric motors, and more specifically, to systems and methods for sensing a line powering an electric motor.

As the world seeks more energy efficiency in operating electric motors, focus often turns to replacing lower efficiency permanent split capacitor (PSC) motors and induction motors with electronically commutated motors (ECMs). When retrofitting and/or designing an ECM, it is often desirable to use the relay power outputs that have been used to drive the PSC to connect with control input pins of the ECM. In this manner, a controller that was originally used to drive the PSC may be used to directly control the ECM. However, at least some known PSC controllers included either electromechanical relays with snubber circuits or used solid state relays (SSRs). This presents a potential problem with the high impedance control input lines on the ECM. The leakage current of the snubber or the SSR may cause a false RUN signal to be sent to the ECM. In this case the motor simply runs all the time, instead of when the relay is activated, resulting in increased operating costs and lowering efficiency of the motor.

BRIEF DESCRIPTION

In one aspect, an electric motor controller configured to be coupled to an electric motor is provided. The controller includes a first power input, a second power input, and a third power input, each of the first, second, and third power inputs are configured to receive power from an alternating current (AC) power source. The controller also includes a microcontroller configured to generate a radio frequency (RF) signal in each of the first, second, and third power inputs. The controller further includes an RF based line sensing device configured to sense which one of said first, second, and third power inputs has received power from the AC power source based on the RF signal.

In another aspect, an electric motor controller configured to be coupled to an electric motor is provided. The controller includes a first power input, a second power input, and a third power input, each of the first, second, and third power inputs are configured to receive power from an alternating current (AC) power source. The controller also includes a first thermistor coupled to the first power input and a second thermistor coupled to the second power input. The first and second thermistors are configured to provide inrush current protection during startup of the electric motor. The controller further includes an input line thermal sensing device coupled to the first and second thermistors. The input line thermal sensing device is configured to sense a temperature of the first and second thermistors and output a unique temperature signal. The controller further includes a microcontroller configured to determine which power input is energized based on the unique temperature signal output by the input line thermal sensing device.

In yet another aspect, a method of sensing a line powering an electric motor is provided. The method includes providing a first power input, a second power input, and a third power input, each of the first, second, and third power inputs configured to receive power from an alternating current (AC) power source. The method also includes generating, by a microcontroller, a radio frequency (RF) signal in each of the first, second, and third power inputs. The method further includes sensing, by an RF based line sensing device, which one of the first, second, and third power inputs has received power from the AC power source based on the RF signal.

The features, functions, and advantages that have been discussed can be achieved independently in various configurations or may be combined in yet other configurations, further details of which can be seen with reference to the following description and drawings.

DETAILED DESCRIPTION

Figure 1:
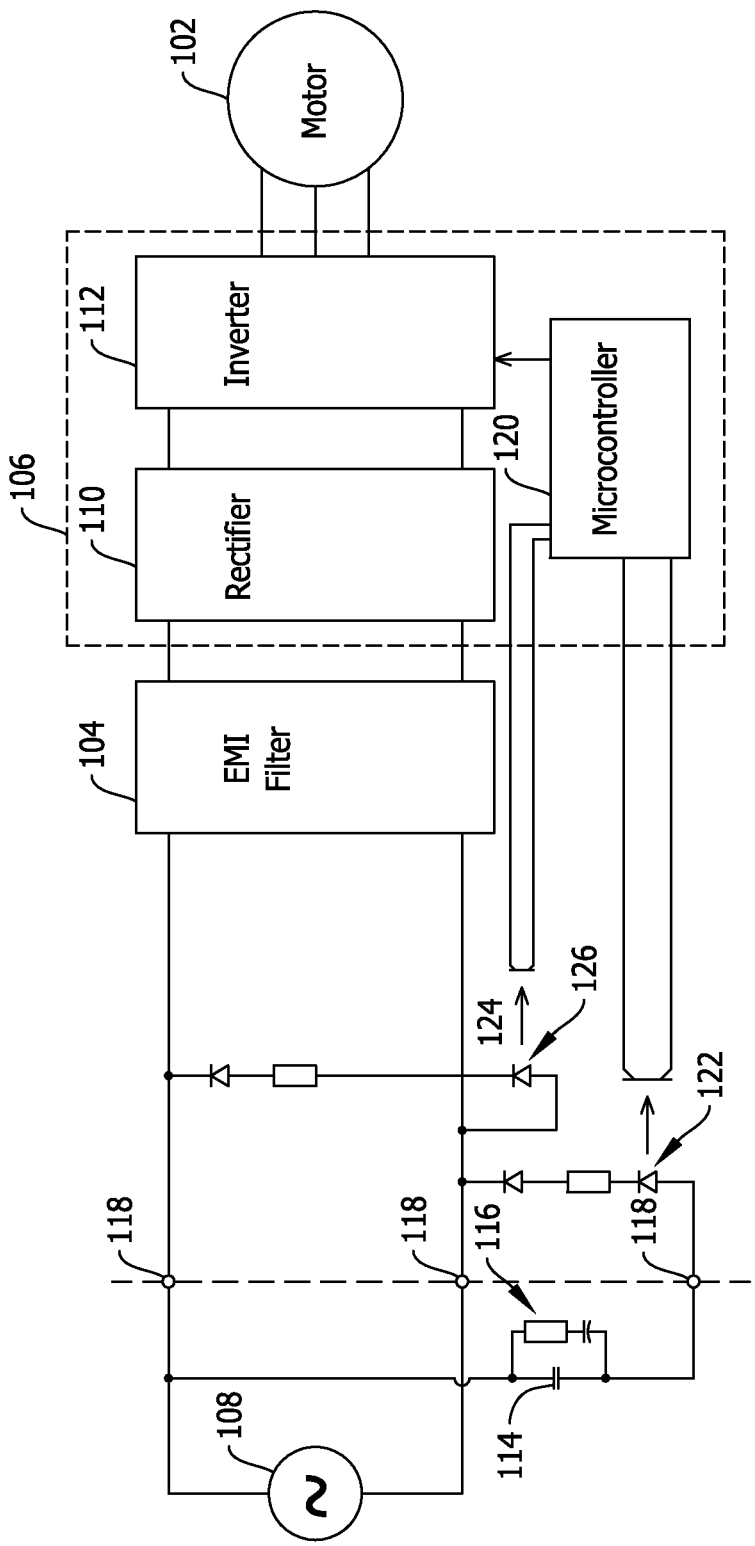
FIG. 1 is a schematic circuit diagram of a motor assembly.

FIG. 1 is a schematic circuit diagram of a motor assembly 100 including an electric motor 102, an EMI filter 104, and a motor controller 106. Motor assembly 100 is configured to be coupled to a power source 108 for receiving input power to drive electric motor 102. Motor 102 is an electronically commutated motor. In other embodiments, motor 102 may be any type of motor that may benefit from EMI reduction, including for example, a permanent magnet synchronous motor (PMSM), a stepper motor, a variable frequency drive, etc. In some embodiments motor 102 may be used in air moving applications used in the heating, ventilation, and air conditioning (HVAC) industry, may be used in fluid pumping applications, and/or may be used in commercial and industrial applications. In other embodiments, motor 102 may engage any suitable work component and be configured to drive such a work component.

In the exemplary embodiment, motor assembly 100, and more particularly EMI filter 104, is coupled to power source 108. More specifically, EMI filter 104 is coupled between power source 108 and motor controller 106. EMI filter 104 is configured to suppress EMI within motor assembly 100.

In the exemplary embodiment, motor controller 106 is configured to control operation of electric motor 102 using AC power from power source 108. Motor controller 106 may include, for example, a rectifier 110 for rectifying or converting the AC power from power source 108 to a direct current (DC) power usable to control the motor, and an inverter 112 for inverting the rectified power to three-phase power for operating electric motor 102. In alternative embodiments, power source 108 may be a DC power source.

Relay contacts 114 and a snubber circuit 116 are coupled together in parallel, and are coupled to power source 108 and to at least one high voltage (HV) input terminal 118 of motor assembly 100. Alternatively, solid state relays (SSRs) may be substituted for relay contacts 114 and snubber circuit 116. When retrofitting electric motor 102 to replace a PSC motor, leakage current of snubber circuit 116 or of SSRs may present a false RUN signal to electric motor 102, causing electric motor 102 to run constantly.

Motor controller 106 further includes a microcontroller 120, which may sometimes be referred to as a microprocessor/DSP. Microcontroller 120 is programmed to control operation of a rotating machine portion (not shown) of electric motor 102. Microcontroller 120 is configured to receive a control signal from a system microcontroller 120 via a first opto-coupler 122 coupled to HV input terminal 118. The control signal indicates an operating mode to be applied in operating electric motor 102.

Motor controller 106 further includes a reference channel 124 configured to provide a reference signal to microcontroller 120 via a second opto-coupler 126. The reference signal is used by microcontroller 120 to differentiate between leakage current present when relay contacts 114 are OFF and when they are genuinely ON. Microcontroller 120 compares the reference signal to the control signal received on normal HV input lines 118. If the control signal is within a specified percentage of timing of the reference signal, microcontroller 120 determines whether the input is ON or OFF and responds to the control signals appropriately.

More specifically, when the relay contacts are open, current on HV input line 118 is being shifted in phase and pulse width with respect to power source 108. This is the OFF state of the control signal, but the leakage current through snubber circuit 116 is enough to turn on first opto-coupler 122 and present a false ON signal to the microcontroller 120.

With the reference signal present, microcontroller 120 distinguishes between the OFF and ON states of relay contacts 114 based on a measureable phase and duration change between reference channel 124 and HV input channel 118. This same methodology may also be used if an SSR is used to energize the HV input circuits. If multiple HV inputs 118 are present, the same principle still applies and microcontroller 120 examines all of the inputs using the same methodology. If snubber circuit 116 is not present on an HV input, and is not an SSR, then first opto-coupler 122 will not be turned on when relay contacts 114 are open. Microcontroller 120 recognizes this state as phase shifted inputs, so electric motor 102 can accommodate multiple input types. If the input reference signal is inverted in phase, then microcontroller 120 uses logic to invert the signal and accomplish the comparison.

Figure 2:
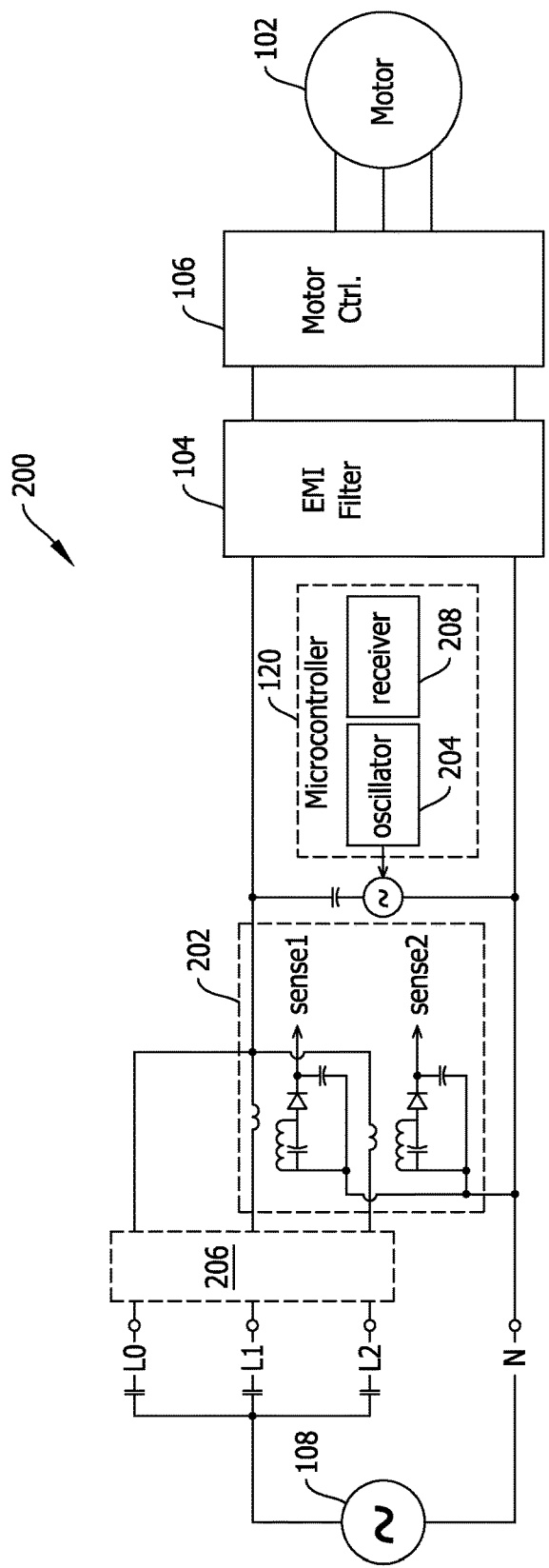
FIG. 2 is a schematic circuit diagram of an exemplary motor assembly including a radio frequency (RF) based line sensing device.

FIG. 2 is a schematic circuit diagram of an exemplary motor assembly 200 including a radio frequency (RF) based line sensing device 202. In the exemplary embodiment, motor assembly 200 is substantially similar to motor assembly 100 (shown in FIG. 1). A system controller (not shown) provides a control signal to microcontroller 120. For example, in a heating, ventilation, and air conditioning (HVAC) application, a thermostat may provide a control signal calling for cooling, heating, or fan only operation of a blower motor. Power source 108 includes four outputs coupled to microcontroller 120: a neutral line N, a line L0, a first line L1, and a second line L2.

In the exemplary embodiment, motor assembly 200 includes RF based line sensing device 202 and microcontroller 120. RF based line sensing device 202 is configured to sense which one of lines L0, L1, or L2 is energized, as is described in more detail herein. RF based line sensing device 202 transmits a signal including power and operation instruction information to microcontroller 120, which conditions the power and determines whether to apply a speed or a torque to electric motor 102 based on the operational information. RF based line sensing device 202 includes a first sensor F1 coupled to first line L1 and a second sensor F2 coupled to second line L2.

In the exemplary embodiment, once the motor receives power and begins running, microcontroller 120 operates an oscillator 204. Oscillator 204 may be a dedicated piece of hardware or microcontroller 120 may use motor windings as an oscillator. Microcontroller 120 toggles oscillator 204 at a very high rate of speed so that an RF signal appears to be conducted through lines L0, L1, and L2 and first and second sensors F1 and F2. First and second sensors F1 and F2 are coupled by a link in the line that is energized. RF based line sensing device 202 is basically a radio receiver, and once voltage is developed at sense1 (output from first sensor F1) or sense2 (output from second sensor F2), microcontroller 120 determines which line L0, L1, or L2 is being energized through the use of RF.

Depending on which line is energized, when oscillator 204 produces an RF signal and couples it to lines L0, L1, or L2, sense1 or sense2 senses a DC voltage level. Microcontroller 120 detects which of sense1 and sense2 has a voltage level, which indicates which line is energized. Line L0 does not include a sensor. If an RF signal is produced, and no signal is sensed at sense1 or sense2, then microcontroller 120 concludes that line L0 is the energized line.

In an alternative embodiment, microcontroller 120 is configured to read existing harmonics on input lines L0, L1, and L2. If electric motor 102 is receiving power, then it is being commanded to run. Although it is unknown at this point which line is energized, because electric motor 102 is being commanded to run, microcontroller 120 can begin running electric motor 102 at its lowest possible speed. While running, electric motor 102 naturally produces harmonics that reach into the radio frequency range. Microcontroller 120 then uses electric motor's 102 own internally generated harmonics for measuring RF.

In another alternative embodiment, current on the energized line may be used to power an RF generator 206. Whichever line L0, L1, or L2 is energized excites RF generator 206. Each line L0, L1, and L2 has a different frequency. Microcontroller 120 includes a receiver 208 that detects the frequency being generated. Based on the generated frequency, microcontroller 120 accesses a look-up table to determine which line L0, L1, or L2 is energized.

In some embodiments, power source 108 is a DC power source. A diode may be provided on each input of power source 108 to isolate the inputs from one another. Additionally, EMI filter 104 may be coupled to an input of inverter 112 (shown in FIG. 1), rather than before rectifier 110.

Figure 3:
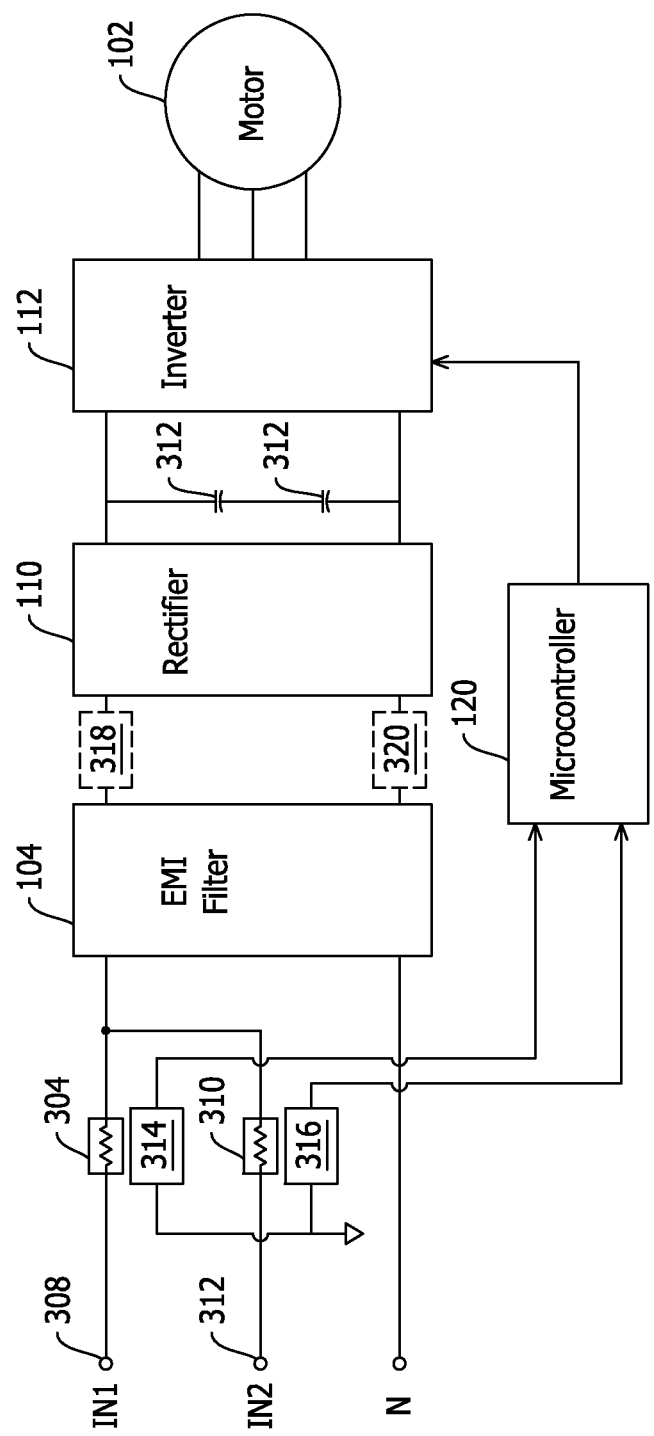
FIG. 3 is a schematic circuit diagram of an exemplary motor assembly including an input line thermal sensing device.

FIG. 3 is a schematic circuit diagram of an exemplary motor assembly 300 including an input line thermal sensing device 302. In the exemplary embodiment, motor assembly 300 is substantially similar to motor assembly 100 (shown in FIG. 1). Motor assembly 300 further includes a first thermistor 304 configured to be coupled to a first AC line input 308 of power source 108 and a second thermistor 310 configured to be coupled to a second AC line input 312 of power source 108. First and second thermistors 304 and 310 are configured to provide inrush current protection during startup of electric motor 102. Specifically, when power is first turned on, electric motor is powered by DC, so there is rectifier 110 on the AC line and there are large bulk capacitors 312 that need to be charged, resulting in a very high initial inrush current. Once power is applied, electric motor 102 begins running at its lowest speed. In the exemplary embodiment, at room temperature, first and second thermistors 304 and 310 have a relatively high resistance. As current flows through first and second thermistors 304 and 310, they heat up very quickly, and their resistance lowers as the temperature increases. An equilibrium point is quickly reached between the current flowing through them and the temperature they generate.

In the exemplary embodiment, motor assembly 300 further includes a first temperature sensor 314 coupled to first thermistor 304 and a second temperature sensor 316 coupled to second thermistor 310. For example, first and second temperature sensors 314 and 316 are temperature sensitive resistors. In the exemplary embodiment, temperature sensors 314 and 316 are silicone based sensing elements that provide a unique signal to microcontroller 120. Temperature sensors 314 and 316 communicate temperatures of first and second thermistors 304 and 310, respectively, to microcontroller 120. Microcontroller 120 monitors the received temperatures and whichever thermistor 304 or 310 has a rapid increase in temperature is the line providing the current.

In an alternative embodiment, temperature sensors 314 and 316 may be coupled to rectifier 110 or to a heat sink of rectifier 110. In such an embodiment, a separate rectifier would be coupled to first and second AC line inputs 308 and 312. For example, first temperature sensor 314 would be coupled to a first rectifier 318 on first AC line input 308 and second temperature sensor 316 would be coupled to a second rectifier 320 on second AC line input 312.

In some embodiments, power source 108 is a DC power source. A diode may be provided on each input 306 and 312 of power source 108 to isolate inputs 306 and 312 from one another. Additionally, EMI filter 104 may be coupled to an input of inverter 112 (shown in FIG. 1), rather than before rectifier 110.

A technical effect of the methods and systems described herein may include one or more of: (a) providing a first power input, a second power input, and a third power input, each of the first, second, and third power inputs configured to receive power from an alternating current (AC) power source; (b) generating, by a microcontroller, a radio frequency (RF) signal in each of the first, second, and third power inputs; and (c) sensing, by an RF based line sensing device, which one of the first, second, and third power inputs has received power from the AC power source based on the RF signal.

Exemplary systems and methods for sensing a line powering an electric motor are described above in detail. The systems and the methods are not limited to the specific implementations described herein but, rather, components of the systems and/or steps of the methods may be utilized independently and separately from other components and/or steps described herein. Further, the described operations and/or components may also be defined in, or used in combination with, other systems, methods, and/or networks, and are not limited to practice with only the network system as described herein.

The systems described herein are not intended to suggest any limitation as to the scope of use or functionality of any aspect of the disclosure. In addition, the systems described herein should not be interpreted as having any dependency or requirement relating to any one or combination of components illustrated in the exemplary operating environment.

The order of execution or performance of the operations in the disclosure illustrated and described herein is not essential, unless otherwise specified. That is, the operations may be performed in any order, unless otherwise specified, and the disclosure may include additional or fewer operations than those disclosed herein. For example, it is contemplated that executing or performing a particular operation before, contemporaneously with, or after another operation is within the scope of aspects of the disclosure.

Although specific features of various implementations may be shown in some drawings and not in others, this is for convenience only. In accordance with the principles of the disclosure, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor controller configured to be coupled to an electric motor, said controller comprising:
   a first power input connector, a second power input connector, and a third power input connector, each of said first, second, and third power input connectors configured to receive power from an alternating current (AC) power source, wherein only one of said first, second, and third power input connectors is energized at a time;
   a radio frequency (RF) based line sensing device coupled to at least said first and second power input connectors and configured to generate a sensing device signal when one of said at least said first and second power input connectors is energized by the AC power source, wherein the sensing device signal is based on an RF signal generated in said first, second, and third power input connectors; and
   a microcontroller configured to:
      generate the RF signal in said first, second, and third power input connectors while one of said first, second, and third power input connectors is energized; and
      determine which of said first, second, and third power input connectors is energized based at least in part on whether the sensing device signal is received by said microcontroller.

2. A controller in accordance with claim 1, wherein said microcontroller is configured to toggle an oscillator above a predetermined rate of speed such that the RF signal appears to be conducted through said first, second, and third power input connectors.

3. A controller in accordance with claim 2, wherein said oscillator comprises one of dedicated hardware located within said microcontroller and motor windings of the electric motor.

4. A controller in accordance with claim 2, wherein said RF based line sensing device comprises a first sensor coupled to said first power input connector and a second sensor coupled to said second power input connector.

5. A controller in accordance with claim 4, wherein one of said first and second sensors is configured to output a voltage level when the one of said first and second sensors is energized.

6. A controller in accordance with claim 4, wherein said third power input connector is sensorless, said microcontroller determines that said third power input connector is energized when the RF signal is produced and no signal is sensed by said first and second sensors.

7. A controller in accordance with claim 1, wherein said microcontroller is configured to:
   operate the electric motor at a lowest speed when power is received;
   monitor harmonics existing on said first, second, and third power input connectors, the harmonics internally generated by the electric motor; and sense which of said first, second, and third power input connectors is energized based on the monitored harmonics.

8. A controller in accordance with claim 1, wherein said RF based line sensing device further comprises an RF generator coupled to said first, second, and third power input connectors, wherein each of said first, second, and third power input connectors has a different frequency and an energized one of said first, second, and third power input connectors excites said RF generator.

9. A controller in accordance with claim 8, wherein said microcontroller further comprises a receiver configured to detect the frequency being generated and determine which power input connector is energized.

10. A controller in accordance with claim 1, further comprising:
a rectifier for rectifying the power received from the AC power source to a direct current (DC) power; and
an inverter for inverting the rectified power to three-phase power for operating the electric motor.

11. A method of sensing a line powering an electric motor, said method comprising:
providing a first power input connector, a second power input connector, and a third power input connector, each of the first, second, and third power input connectors configured to receive power from an alternating current (AC) power source, wherein only one of the first, second, and third power input connectors is energized at a time;
generating, by a microcontroller, a radio frequency (RF) signal in each of the first, second, and third power input connectors while one of said first, second, and third power input connectors is energized;
generating, using a RF based line sensing device coupled to at least the first and second power input connectors, a sensing device signal when one of the at least first and second power input connectors is energized by the AC power source, wherein the sensing device is based on the RF signal generated in the first, second, and third power input connectors; and
determining, by the microcontroller, which one of the first, second, and third power input connectors is energized based at least in part on whether the sensing device signal is received by the microcontroller.

12. A method in accordance with claim 11, further comprising toggling an oscillator above a predetermined rate of speed such that the RF signal appears to be conducted through the first, second, and third power input connectors.

13. A method in accordance with claim 11, wherein sensing which one of the first, second, and third power input connectors has received power from the AC power source further comprises:
providing a first sensor coupled to the first power connector and a second sensor coupled to the second power connector; and
outputting, by one of the first and second sensors, a voltage level when the one of the first and second sensors is energized.

14. A method in accordance with claim 13, further comprising:
providing a sensorless third power input connector; and
determining that the third power input connector is energized when the RF signal is generated and no signal is sensed by the first and second sensors.

15. A method in accordance with claim 11, further comprising:
operating the electric motor at a lowest speed when power is received;
monitoring harmonics existing on said first, second, and third power input connectors, the harmonics internally generated by the electric motor; and
sensing the energized power input connector based on the monitored harmonics.

16. An electric motor controller configured to be coupled to an electric motor, said controller comprising:
a first power input connector, a second power input connector, and a third power input connector, each of said first, second, and third power input connectors configured to receive power from an alternating current (AC) power source, wherein only one of said first, second, and third power input connectors is energized at a time;
a radio frequency (RF) based line sensing device configured to generate a signal based on harmonics measured on at least one of said first, second, and third power input connectors; and
a microcontroller configured to:
operate the electric motor at a lowest speed when power is received on at least one of said first, second, and third power input connectors;
receive the signal from said RF based line sensing device including measured harmonics on at least one of said first, second, and third power input connectors, the harmonics internally generated by the electric motor; and
determine which of said first, second, and third power input connectors is energized based on the measured harmonics.

17. An electric motor controller configured to be coupled to an electric motor, said controller comprising:
a first power input connector, a second power input connector, and a third power input connector, each of said first, second, and third power connectors configured to receive power from an alternating current (AC) power source;
a radio frequency (RF) based line sensing device coupled to said first and second power input connectors and configured to generate a signal when one of said first and second power input connectors is energized by the AC power source based on an RF signal generated in said first, second, and third power input connectors, wherein said RF based line sensing device comprises a first sensor coupled to said first power input connector and a second sensor coupled to said second power input connector; and
a microcontroller configured to:
toggle an oscillator above a predetermined rate of speed such that the RF signal appears to be conducted through said first, second, and third power input connectors to generate the RF signal in said first, second, and third power input connectors; and
determine which of said first, second, and third power input connectors is energized based at least in part on whether the signal is received from said RF based line sensing device.

\* \* \* \* \*